(12) United States Patent
Sauder et al.

(10) Patent No.: US 7,152,540 B1
(45) Date of Patent: Dec. 26, 2006

(54) SEED TUBE FOR AN AGRICULTURAL PLANTER

(75) Inventors: Derek A. Sauder, Tremont, IL (US); Chad E. Plattner, Tremont, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 11/207,549

(22) Filed: Aug. 19, 2005

(51) Int. Cl.
*A01C 7/00* (2006.01)
*A01C 9/00* (2006.01)

(52) U.S. Cl. .................. 111/170; 111/200; 111/903
(58) Field of Classification Search .............. 111/170, 111/174–176, 200, 403, 904
See application file for complete search history.

(56) References Cited

U.S. PATENT DOCUMENTS

| | | | |
|---|---|---|---|
| 4,399,757 A | * | 8/1983 | Maury .................... 111/34 |
| 4,915,258 A | | 4/1990 | Olson |
| 5,533,458 A | | 7/1996 | Bergland et al. |
| 5,542,363 A | * | 8/1996 | Gamino .................. 111/170 |
| 6,332,413 B1 | * | 12/2001 | Stufflebeanm et al. ...... 111/170 |

* cited by examiner

Primary Examiner—Christopher J. Novosad
(74) Attorney, Agent, or Firm—Larkin Hoffman Daly & Lindgren Ltd.; Thomas J. Oppold

(57) ABSTRACT

A seed tube for an agricultural planter having a rearwardly curving forward wall, a rearwardly curving rearward wall and opposing side walls defining a seed passageway which curves rearwardly from an upper ingress end toward a lower egress end. An aperture is disposed in the forward wall adapted to receive a seed sensor element. An overlap extends over a portion of the aperture. The tube has an upper portion and a lower portion. The forward wall of the lower portion disposed forwardly of the forward wall of the upper portion, such that an interior surface of the forward wall of the lower portion is disposed forwardly of an interior surface of the forward wall of the upper portion.

8 Claims, 4 Drawing Sheets

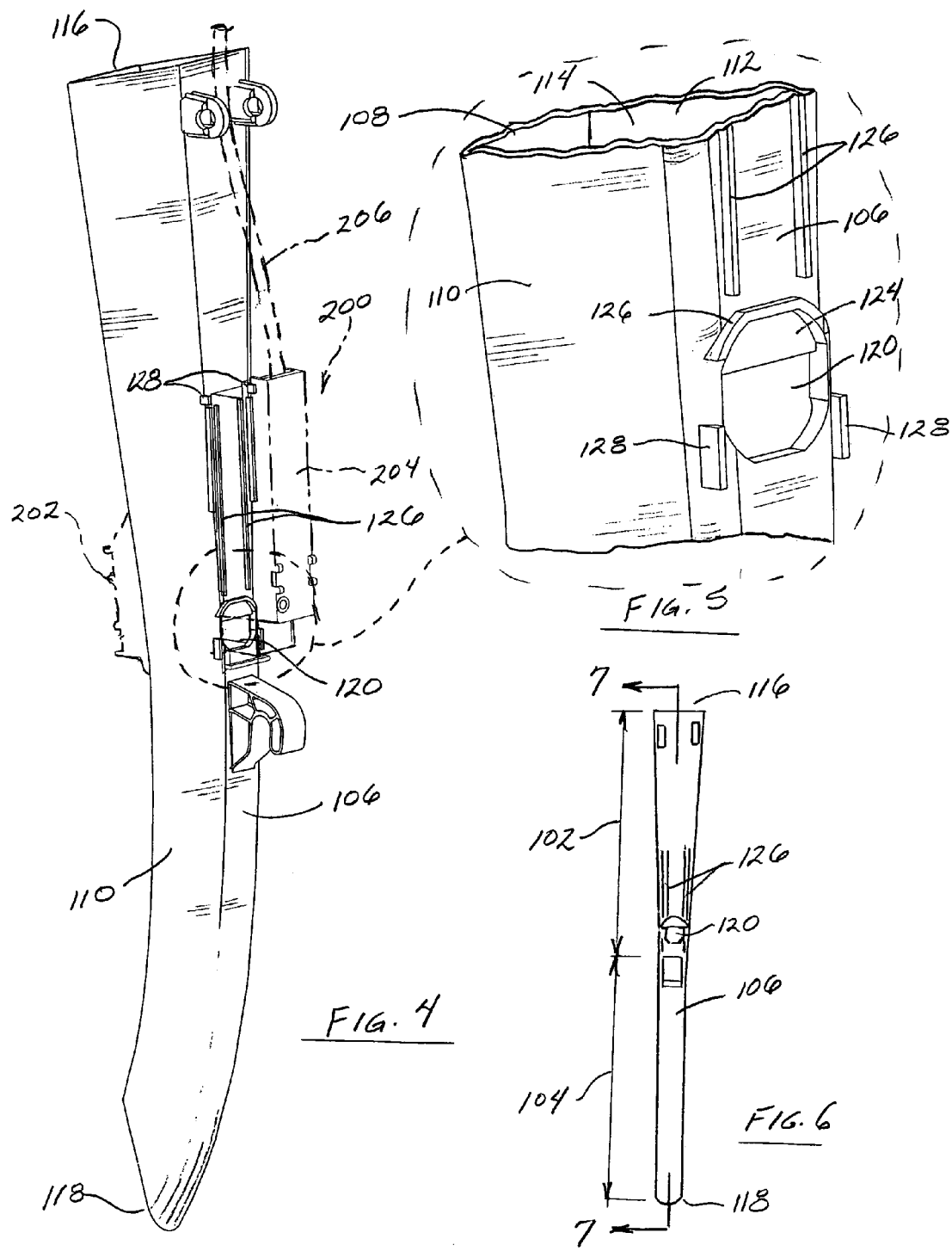

SEED TUBE FOR AN AGRICULTURAL PLANTER

BACKGROUND OF THE INVENTION

Most agricultural row-crop planters, such as, for example, the John Deere 7000 series planter 10, of which FIG. 1 is a representation, comprises of a plurality of individual row units 14 spaced along the length of a transverse tool bar 12. Each row unit includes a subframe 16 which supports a seed hopper 20 containing a supply of seeds to be planted. Disposed below the seed hopper 20 is a seed meter with a seed belt housing 30 which dispenses individual seeds 32 at regular spaced intervals into a seed tube 36. The seed tube comprises a rearwardly curving forward and rearward wall members and opposing sidewall members thereby defining a rearwardly curving passageway. The seeds discharged from the seed meter 30 are received into the open top end of the seed tube 36 and are guided rearwardly by the rearwardly curving passageway until being released into the seed furrow 38 upon exiting the open bottom end of the seed tube 36 disposed a short distance above and substantially in line with the seed furrow 38. The furrow opening assembly 24 forms the seed furrow 38 forwardly of the seed tube. The furrow closing assembly 26 covers the deposited seeds in the furrow 38 with soil.

Disposed at approximately the midpoint of the seed tube 36 is a seed sensor 40. U.S. Pat. No. 5,533,548 to Bergland et al., hereby incorporated by reference, discloses a seed tube with a seed sensor mounted thereto. FIG. 2 illustrates an enlarged detailed view of the seed tube 36 with the seed sensor 40 mounted thereto illustrated in FIG. 1, but with the seed tube in cross-section, and showing the "ramp" in the seed tube as disclosed in Bergland '548. The purpose of the seed sensor 40 is to detect seeds as they pass through the seed tube as part of system for determining a seed population count. The seed sensor also operates as part of a warning system to notify the planter operator by an audible and/or visual alarm if the sensor fails to detect any passing seeds over a predefined period of time, which would indicate a problem with the row unit, such as the seed hopper running empty, or a malfunction of the seed meter, or the sensor, etc.

There are various types of sensors suitable for detecting seeds passing through a seed tube. Photoelectric sensors, such as the type manufactured by Dickey-John Corporation of Auburn, Ill., are among the most common sensors used with seed tubes. Continuing to refer to FIG. 2, photoelectric seed tube sensors generally include a light source element 40A and a light receiving element 40B disposed over apertures 42, 44 in the forward and rearward walls of the seed tube. Whenever a seed passes between the light source and the light receiver, the seed interrupts the light beam and the seed is detected.

It has been found that, the aperture 44 and/or the seed sensor element 40A may act as catch points for seeds traveling through the seed tube, thereby causing the seeds to ricochet off the catch point. Additionally, due to differences in fabrication tolerances of the wall thicknesses of the seed tubes and in dimensional tolerances of the sensor elements, and due to improper installation and other factors, the sensor element 40A may project into the seed tube instead of being flush with the interior surface of the seed tube wall as intended, thereby also presenting the problem of interference with the trajectory of the seed passing through the seed tube.

It is well recognized that proper and uniform spacing of seed in the furrow is essential to maximizing crop yield. Thus, any interference with a seed passing through the seed tube will result in inconsistent seed spacing in the furrow, whether due to some seeds passing more quickly through the seed tube than others, or as a result of the seed trajectory being effected upon exit of the seed from the seed tube. Various designs have been proposed to address the problem of minimizing catch points in the seed tube which interfere with the trajectory of the passing seeds.

For example, Bergland '548 (FIG. 2) proposes thickening the forward wall 46 above the sensor aperture 44 thereby forming an inwardly projecting ramp 48 above the sensor 40A. The ramp 48 purportedly serves as a transition to smoothly direct the seeds inwardly and away from the sensor element 40A projecting into the tube passageway through the aperture 44. Despite the purported function of the ramp to direct seeds inward and away from the seed sensor catch point, tests on commercial embodiments of the Bergland' 548 apparatus show that a catch-point is still present at the bottom of the aperture and/or at the bottom of the sensor element 40A for seeds traveling through the seed tube along the path of travel indicated by reference number 50, resulting in seeds bounces or ricocheting wildly off the seed sensor element 40A.

Another attempt to resolve the problem of catch-points in the seed tube is illustrated in FIG. 3, which is intended to represent the proposed solution disclosed in U.S. Pat. No. 6,332,413 to Stufflebeanm et al. In Stufflebeanm '413, the lower portion of the forward wall 46 of the seed tube below the sensor aperture 44 is stepped forward of the upper portion of the forward wall 46 above the sensor aperture 44. Although, the offset or stepped lower wall structure proposed in Stufflebeanm '413 appears to resolve the catch-point problem within the seed tube, providing such a large step or offset to avoid the catch-point presents additional problems.

First, in many applications, providing an offset sufficient to avoid catch-points is not possible due to space restrictions.

Second, a large offset negatively effects the ideal trajectory of the seed as it passes through the seed tube. Ideally, seeds will consistently contact the forward wall just above the aperture 44 and then slide along the rearwardly curving forward wall until exiting the tube. The larger the offset, the longer the seed will be in free-flight after passing the aperture before it again contacts the front wall, resulting in increased velocity of the seeds, which in turn results in greater force on impact when the seeds contact the forward wall again. Furthermore, the farther down the tube the seeds contact the wall, the greater the curvature and thus the closer the angle of incidence of the seed to being normal or perpendicular to the wall at the point of impact. The greater velocity, combined with the more perpendicular angle of incidents, results in greater likelihood of seed ricochet and inconsistent velocities and trajectories of the seeds upon exiting the seed tube.

Accordingly, there remains a need in the industry for a seed tube which not only eliminates catch-points in the seed tube resulting from the sensor apertures and sensor, but which minimizes any disturbance in the ideal trajectory of the seed passing through the seed tube.

SUMMARY OF THE INVENTION

The present invention is directed toward a seed tube for an agricultural planter. The seed tube includes a rearwardly curving forward wall, a rearwardly curving rearward wall and opposing side walls defining a seed passageway which curves rearwardly from an upper ingress end toward a lower egress end. An aperture is disposed in the forward wall adapted to receive a seed sensor element. The forward wall below the aperture is offset forwardly of the forward wall above the aperture such that the interior surface of the offset lower forward wall is forward of the interior surface of the upper forward wall. An overlap extends over at least a portion of the aperture, the overlap in cooperation with the offset prevents any portion of the seed sensor from projecting inwardly into the seed passageway beyond the interior surface of the offset lower forward wall.

BRIEF DESCRIPTION OF THE DRAWINGS

The embodiment of the seed tube as shown in the following drawings, are illustrative only, and it should be understood that changes may be made in the specific form illustrated and described without materially departing from the teachings herein.

FIG. 4 is a perspective view of an embodiment of the seed tube of the present invention showing the forward wall portion and illustrating in phantom lines a sensor mounted thereon.

FIG. 5 is an enlarged view of the portion of the seed tube circled in FIG. 4, but with the phantom lines of the sensor removed for clarity.

FIG. 6 is a front elevation view of the seed tube of FIG. 4

DETAILED DESCRIPTION OF THE INVENTION

FIGS. 4–8 illustrate a preferred embodiment of the seed tube 100 of the present invention. The seed tube 100 is illustrated as having a linear upper portion 102 (FIGS. 6 and 7) and a rearwardly curved lower portion 104. However, it should be appreciated that the seed tube 100 may have a geometry such as disclosed in U.S. Pat. No. 4,915,258 to Olson having a logarithmically curved upper portion, and an exponentially curved lower portion. Alternatively, the seed tube 100 may have any one of the geometries as disclosed in U.S. Pat. No. 6,332,413 to Stufflebeanm et al. Both the Olson '258 patent and Stufflebeanm '413 patents are hereby incorporated herein by reference. Alternatively, any other geometry may be utilized for the seed tube 100 of the present invention, so long as the geometry is capable of directing seeds dispensed therein into the seed furrow.

Figure 1:
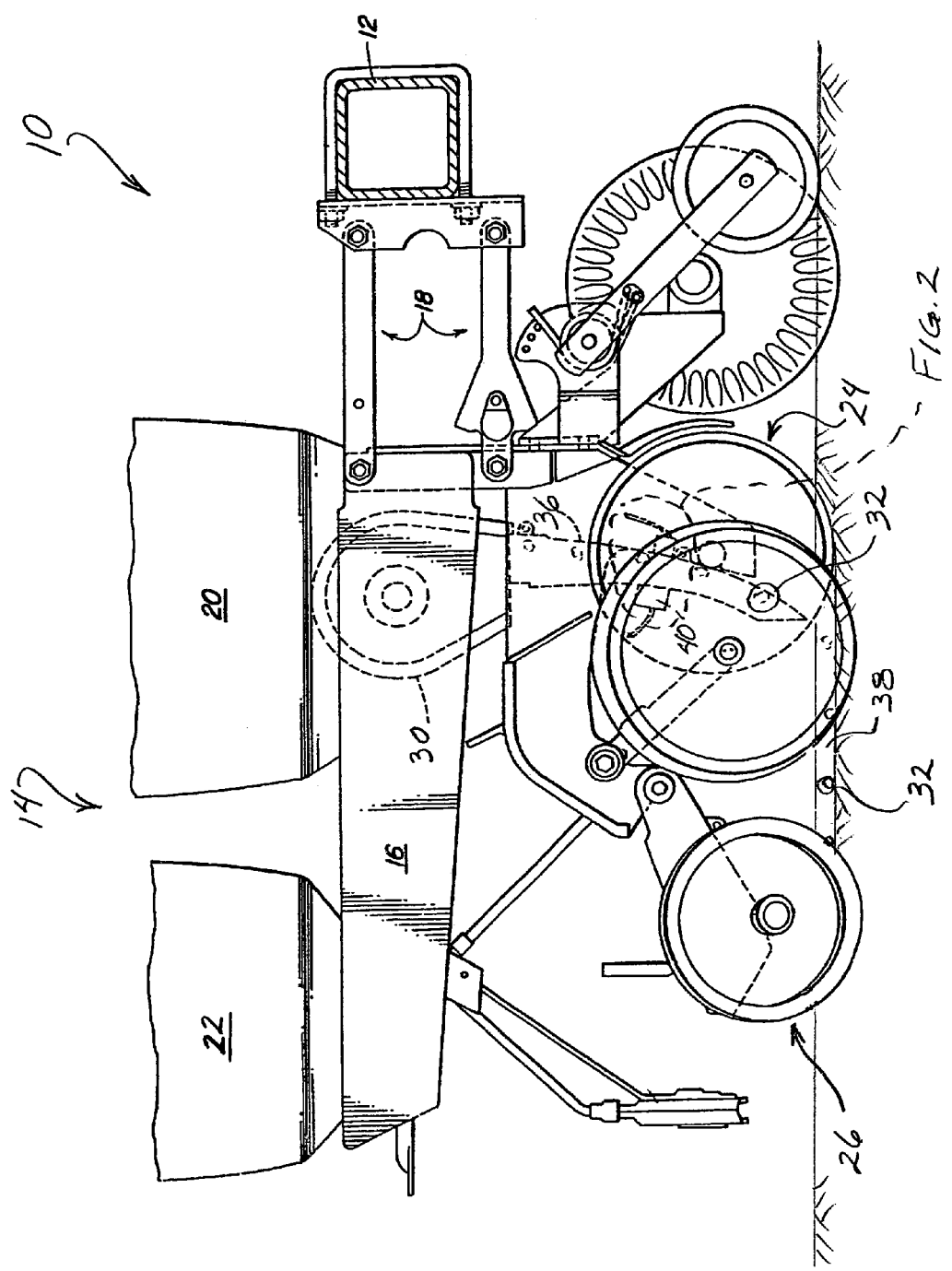
FIG. 1 is a side view of a planter row unit.
Figure 2:
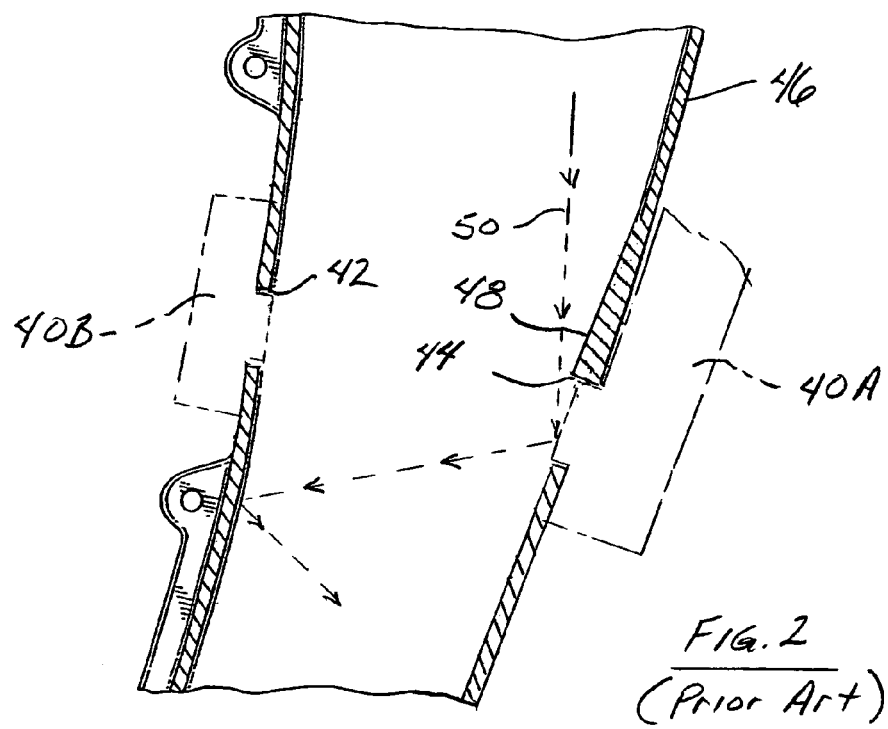
FIG. 2 is an enlarged cross-sectional view of the portion of the prior art seed tube disclosed in U.S. Pat. No. 5,533,548 to Bergland et al. illustrating the ramped portion of the seed tube above the sensor aperture.
Figure 3:
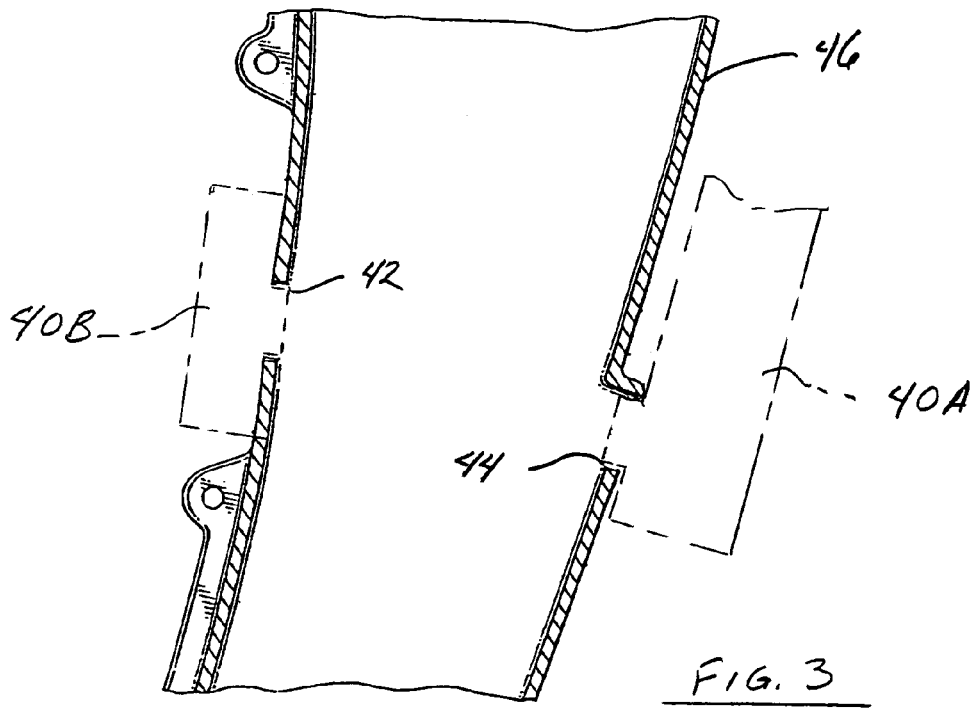
FIG. 3 is an enlarged cross-sectional view of the portion of the prior art seed tube disclosed in U.S. Pat. No. 6,332,413 to Stufflebeanm et al. illustrating the lower portion of the seed tube stepped forwardly of the upper portion of the seed tube.
Figures 7, 8:
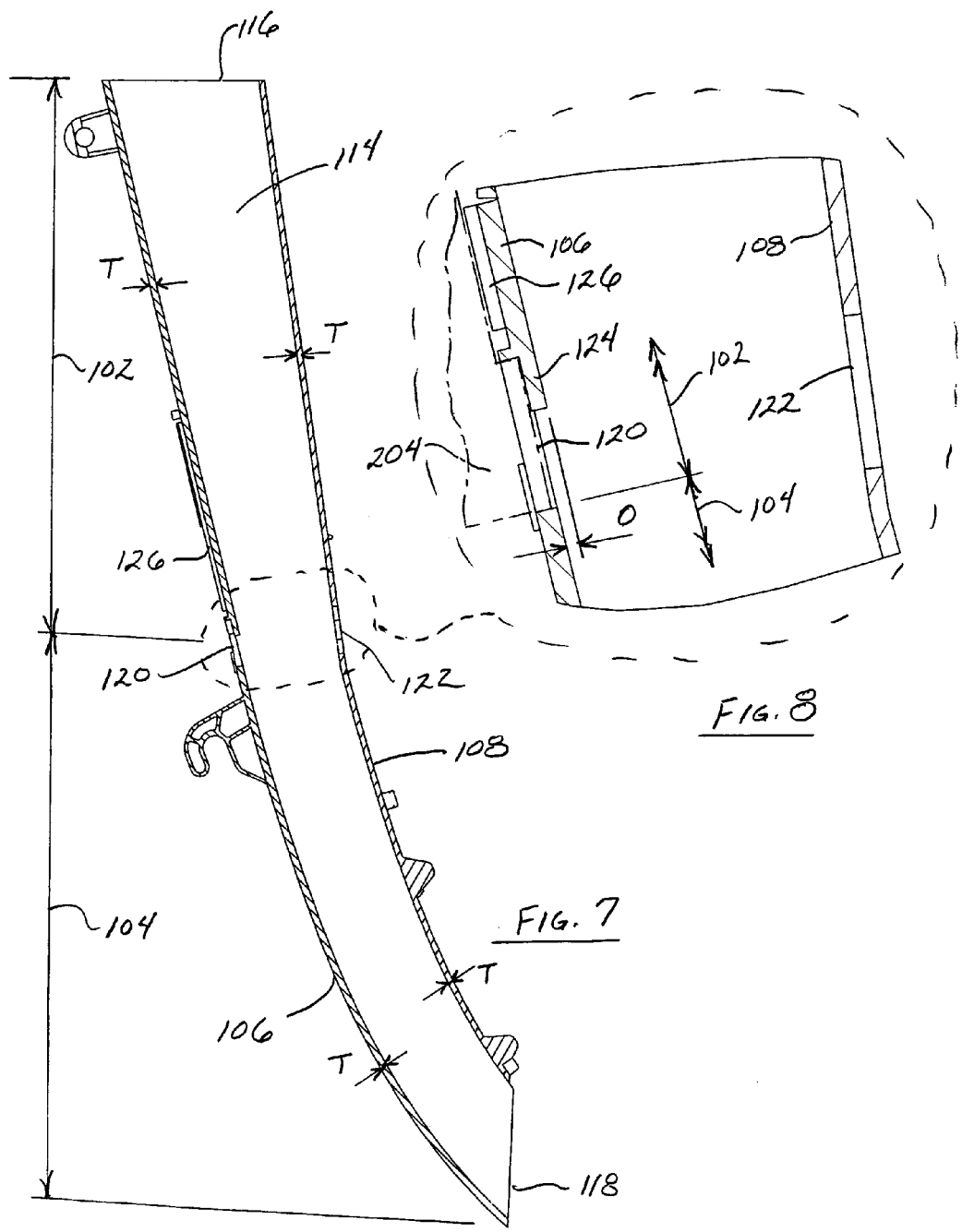
FIG. 7 is a cross-sectional view of the embodiment of the seed tube of FIG. 6 as viewed along lines 7—7.
FIG. 8 is an enlarged view of the portion of the seed tube circled in FIG. 7.

As best illustrated in FIGS. 4, 5 and 7, wherein FIG. 7 is a cross-sectional view of the tube 100 as viewed along lines 7—7 of FIG. 6, the seed tube 100 includes a forward wall 106, a rearward wall 108, and opposing side walls 110, 112 thereby defining a passageway 114. As viewed from the front of the tube 100 in FIG. 6, the width of the tube 100 decreases from a maximum at the upper ingress end 116 to a minimum at the approximate juncture between the upper portion 102 and the lower portion 104, which is carried through the remainder of the lower portion 104 to the egress end 118. As illustrated in FIG. 7, the thickness "T" of the walls is preferably substantially uniform between all the walls 106, 108, 110, 112 and along the entire length of the tube 100.

The seed tube 100 is provided with two sensor apertures, a sensor aperture 120 located on the forward wall 106 and a second sensor aperture 122 located on the rearward wall 108 directly opposite. The light source element 202 of the photoelectric sensor assembly 200 is mountable to be disposed in the second aperture 122 in the rearward wall 108. The light receiving element 204 of the sensor assembly 200 is mountable in the first aperture 120 in the forward wall 106. The light source element and light receiving element are connected to a monitor (not shown) generally positioned in the tractor cab by an electrically conductive cable 206.

As best illustrated in FIGS. 5 and 8 the lower portion 104 of the forward wall is offset forwardly a distance "O." An overlap 124 extends over approximately the top half of the sensor aperture 120. The overlap 124 minimizes the amount of exposure the passing seeds will have to any catch points without effecting sensor performance, thereby minimizing the amount of offset required to achieve the same end result. Spacers 126 preferably project forwardly from the forward wall 106. Additionally, tabs 128 are provided to center the sensor within the aperture and to help restrain it in position. Tie straps (not shown) are used to secure the sensor to the seed tube in the conventional manner.

Although only certain exemplary embodiments of the seed belt of present invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. In combination, for an agricultural planter, a seed sensor having first and second seed sensing elements and a seed tube defining a seed passageway which curves downwardly and rearwardly from an upper ingress end toward a lower egress end, said seed tube comprising:

a rearwardly curving downwardly extending forward wall, a rearwardly curving, downwardly extending rearward wall and opposing side walls, said forward wall having an interior surface;

first aperture disposed through said forward wall and receiving the first seed sensor element;

a second aperture disposed through said rearward wall in opposing relation to said first aperture and receiving the second seed sensor element;

the seed tube further having an upper portion and a lower portion, said interior surface of said forward wall of said lower portion offset a distance forwardly of said interior surface of said forward wall of said upper portion;

an overlap extending over at least a portion of said first aperture to prevent the first seed sensor element from projecting into said seed passageway beyond said interior surface of the offset lower forward wall.

2. The combination of claim 1 wherein said overlap comprises an extension of said forward wall of said upper portion.

3. The combination of claim 1 wherein said tube further comprises spacers projecting forwardly from said forward wall to further prevent the first seed sensor element projecting into said seed passageway beyond the interior surface of the offset lower forward wall.

4. The combination of claim 1 wherein said tube further comprises tabs to aid in centering the first sensor element within said first aperture and to aid in securing the first sensor element to the tube.

5. A seed tube comprising:
- a seed passageway which curves downwardly and rearwardly from an upper ingress end toward a lower egress end defined by a rearwardly curving downwardly extending forward wall, a rearwardly curving, downwardly extending rearward wall and opposing side walls, said seed passageway having an upper portion and a lower portion, said forward wall of said lower portion offset a distance forwardly of said forward wall of said upper portion;
- an aperture disposed through said forward wall;
- an overlap extending over at least a portion of said aperture, said overlap continuing in substantially the same plane as said forward wall.

6. The seed tube of claim 5 wherein said overlap comprises an extension of said forward wall of said upper portion.

7. The seed tube of claim 5 further comprising seed sensor spacers projecting forwardly from said forward wall.

8. The seed tube of claim 7 further comprising tabs to aid in centering a seed sensor element within said aperture and to aid in securing the seed sensor element to the seed tube.

* * * * *